United States Patent [19]
Carletti et al.

[11] Patent Number: 5,421,704
[45] Date of Patent: Jun. 6, 1995

[54] INTER-BLADE PLATFORM FOR A BLADED DISC OF A TURBOMACHINE ROTOR

[75] Inventors: Ollivier Carletti, Vaux le Penil; Gérard F. Inizan, Yerres; Gérard E. A. Jourdain, Saintry S/Seine; Francois M. P. Marlin, Villier sous Grez; Philippe J. P. Pabion, Le Mee S/Seine; Thierry G. Pancou, Melun; Laurence Prato, Cesson; Dominique Raulin, Avon; Christine J. G. Ruffier, Vitry S/Seine, all of France

[73] Assignee: Societe Nationale d'Etude et de Construction de Moteurs d'Aviation "SNECMA", Paris, France

[21] Appl. No.: 258,175

[22] Filed: Jun. 10, 1994

[30] Foreign Application Priority Data

Jun. 10, 1993 [FR] France .................. 93 06957

[51] Int. Cl.⁶ .................................... F01D 5/22
[52] U.S. Cl. ............................. 416/193 A; 416/241 R
[58] Field of Search ........... 416/193 A, 241 R, 244 R, 416/248

[56] References Cited

U.S. PATENT DOCUMENTS

| | | |
|---|---|---|
| 1,331,209 | 9/1973 | Goodwin . |
| 3,294,364 | 12/1966 | Stanley . |
| 3,393,862 | 7/1968 | Harrison . |
| 4,334,827 | 6/1982 | Bouiller et al. ............. 416/193 A |
| 4,700,647 | 10/1987 | Pabsch . |
| 5,127,802 | 7/1992 | Carlson et al. . |
| 5,222,865 | 6/1993 | Corsmeier ............. 416/193 A |
| 5,281,096 | 1/1994 | Harris et al. ............. 416/193 A |

FOREIGN PATENT DOCUMENTS

| | | |
|---|---|---|
| 0017567 | 10/1980 | European Pat. Off. ........ 416/193 A |
| 0212724 | 3/1987 | European Pat. Off. . |
| 0370899 | 5/1990 | European Pat. Off. . |
| 2679296 | 1/1993 | France . |
| 2006883 | 5/1979 | United Kingdom . |
| 2171151 | 8/1986 | United Kingdom . |

Primary Examiner—Edward K. Look
Assistant Examiner—Mark Sgantzos
Attorney, Agent, or Firm—Oblon, Spivak, McClelland, Maier & Neustadt

[57] ABSTRACT

A separate inter-blade platform for a turbomachine rotor comprises a structural rectilinear longitudinal member formed by a foam core, plies of a carbon/epoxy type material in bidirectional layers of crossed fibres oriented at 45° laid around the core and around an insert at each end of the longitudinal member, each insert being made of juxtaposed radial plies of a carbon/epoxy type material in bidirectional layers of fibres crossed at ±45 degrees, and further plies of a carbon/epoxy type material in unidirectional layers oriented in the direction of the major axis of the longitudinal member covering the upper and lower faces of the member, the platform further comprising lateral packing cores made of a foam material, plies of a glass/epoxy type material covering the lateral faces of the longitudinal member and connecting it to the lateral foam cores, and peripheral plies of a glass/epoxy type material covering the assembly formed by the longitudinal member and the lateral cores connected thereto.

1 Claim, 3 Drawing Sheets

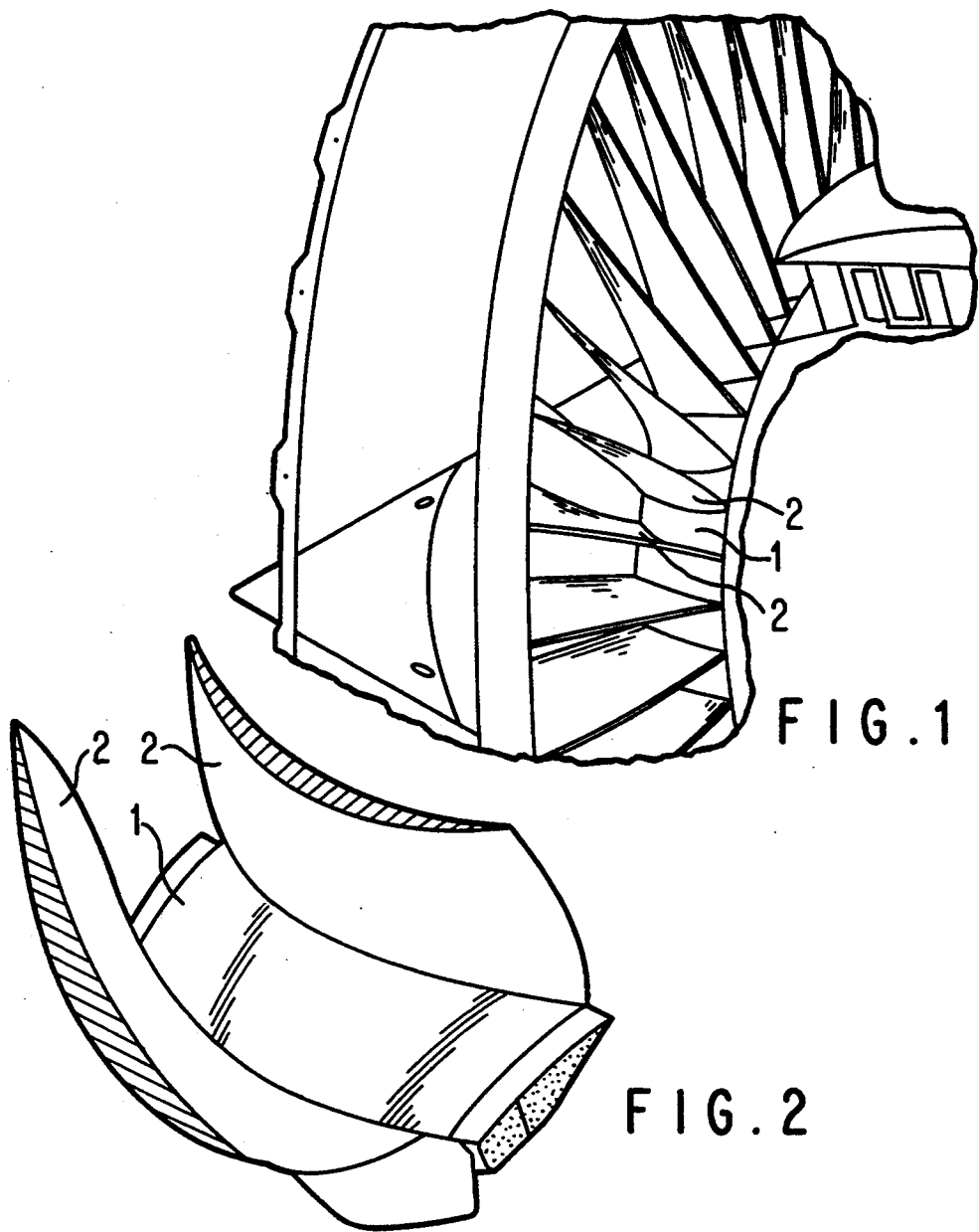
FIG.1
FIG.2
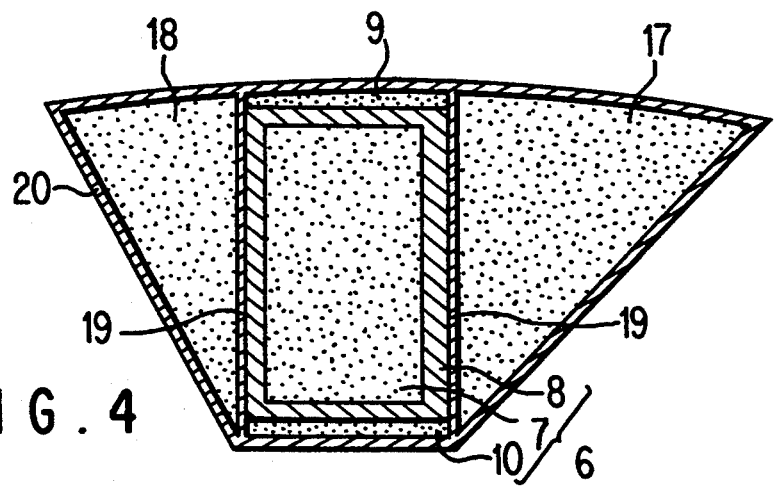
FIG.4

INTER-BLADE PLATFORM FOR A BLADED DISC OF A TURBOMACHINE ROTOR

BACKGROUND OF THE INVENTION

1. Field of the Invention

The present invention relates to an individual inter-blade platform for a bladed disc of a turbomachine rotor, especially the rotor of the fan of a turbojet engine or the rotor of a compression stage of an aircraft engine.

2. Summary of the Prior Art

In the construction of turbomachine rotors, particularly rotors of the type mentioned above, it is known, for example for the purpose of permitting unitary demounting in the case of large chord blades having a substantial twist and/or facilitating their manufacture, either in the course of machining operations or if using composite materials, to construct the blades in several parts, and in particular by providing separate inter-blade platforms, one of the functions of which is to form a continuous wall for bounding the air flow path. Examples of these known techniques are described in GB-A-2 006 883, GB-A-2 171 151 and U.S. Pat. No. 3,393,862 which disclose the use of separate inter-blade platforms and various ways of securing them on the rotor. The use of composite materials in the construction of these parts has also been envisaged.

FR-A-2639402 discloses another example of the construction with particular methods of effecting the fixing of the platform on the rotor disc, and in some cases the platform is made from a composite material of laminated type by winding or laying of fabrics. Another example of the construction is disclosed in FR-A-2 679 296 which describes a platform formed by two parts made of composite material, namely a four-sided structural frame of trapezoidal section and made of laminated material, and a plate made of polyurethane type material.

It is an object of the invention to provide an inter-blade platform for a rotor which retains the above-mentioned advantages of existing solutions, particularly the ability to demount the rotor blades individually, and which has a mass which is as small as possible, this being an important requirement for a rotating part, especially in aeronautical applications.

A further object of the invention is to provide a platform with sufficient rigidity such that it does not flex, particularly under the action of a centrifugal field, and thus does not alter local aerodynamic conditions.

Furthermore, having regard to the applications envisaged, and particularly in the case of a fan which is placed at the upstream end of the engine, it is necessary for the platform to exhibit suitable resistance to impact and erosion resulting from the ingestion of foreign bodies at the engine intake, such as hailstones, grit, sand and various types of dust.

SUMMARY OF THE INVENTION

According to the invention, there is provided a separate inter-blade platform for a bladed disc of a turbomachine rotor, comprising a rectilinear structural longitudinal member defining a major axis and having opposite ends, upper and lower outer faces, and lateral outer faces, said longitudinal member being constituted by a foam core, an insert at each of said ends of said longitudinal member, each said insert being formed by juxtaposed radial plies of a carbon/epoxy type material in bidirectional sheets of fibres crossed at ±45 degrees, plies of a carbon/epoxy type material in bidirectional sheets of crossed fibres oriented at 45 degrees relative to said major axis laid around said foam core and said inserts, and plies of a carbon/epoxy type material in unidirectional sheets oriented in the direction of said major axis covering said plies laid around said foam core and said inserts on said upper and lower outer faces of said longitudinal member, lateral packing cores made of foam, plies of a glass/epoxy type material covering said lateral outer faces of said longitudinal member and connecting said longitudinal member to said lateral packing cores, and peripheral plies of a glass/epoxy type material covering the assembly formed by said longitudinal member and said lateral packing cores connected thereto.

Other preferred features and advantages of the invention will become apparent from the following description of one embodiment of the invention, given by way of example, with reference to the attached drawings.

BRIEF DESCRIPTION OF THE DRAWINGS

FIG. 1 is a diagrammatic partial perspective view of the rotor of a fan in a turbojet engine incorporating inter-blade platforms in accordance with one embodiment of the invention.

FIG. 2 is a view of a part of FIG. 1 to a larger scale, showing one of the platforms between two blades of the rotor.

FIG. 4 is a transverse sectional view through the platform.

DESCRIPTION OF THE PREFERRED EMBODIMENT

Figure 3:
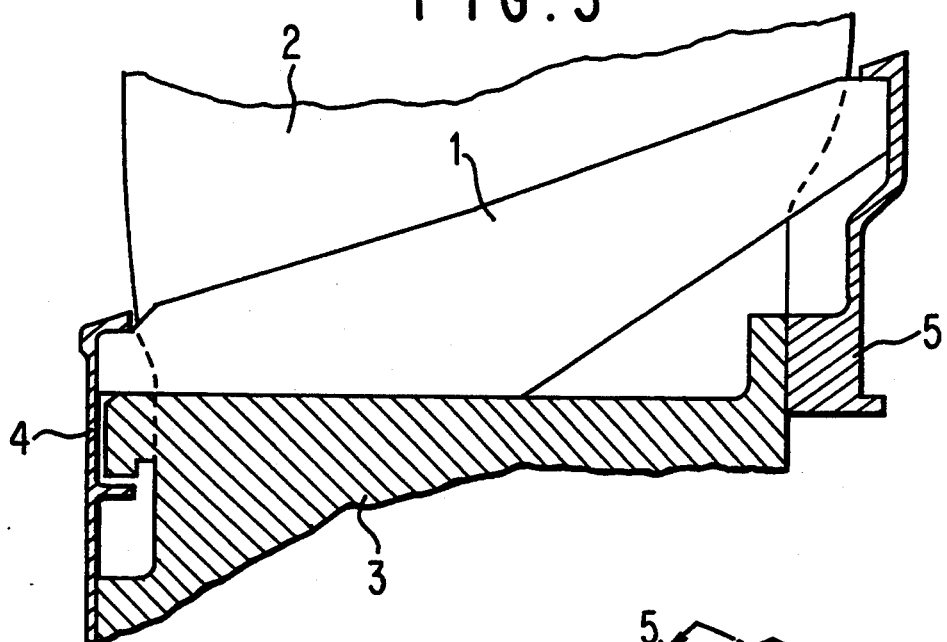
FIG. 3 is a partial sectional view in a plane passing through the longitudinal axis of rotation of the rotor of FIGS. 1 and 2, showing the fixing of the platform to the rotor.

Individual inter-blade platforms 1 in accordance with the invention are intended to be mounted on a turbomachine disc between adjacent blades 2 to form a bladed disc of a rotor, for example for a fan as in the example shown in FIGS. 1 and 2 or for a compression stage. The mounting of the platforms 1 on the disc 3 is effected by upstream and downstream plates 4 and 5 as shown in FIG. 3.

An embodiment of the platform 1 in accordance with the invention is shown in cross-section in FIG. 4 and comprises a structural rectilinear longitudinal member 6 formed by a foam core 7 covered with layers 8 of bidirectional plies of a carbon/epoxy type material having crossed fibres, oriented at 45 degrees relative to the major axis 100 (FIG. 5) of the longitudinal member, and, on its upper and lower faces, with an additional layer 9, 10 respectively of unidirectional plies of carbon/epoxy type material in which the fibres are oriented parallel to the major axis 100 of the longitudinal member.

Figure 5:
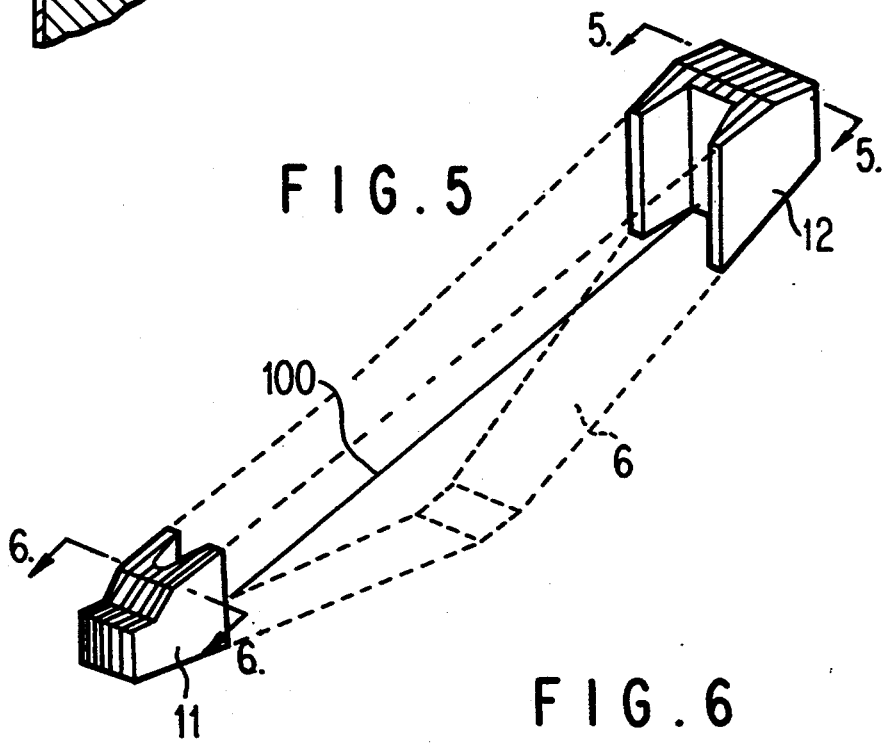
FIG. 5 is a perspective view of a component of the platform, showing the inserts at each end thereof.
Figure 6:
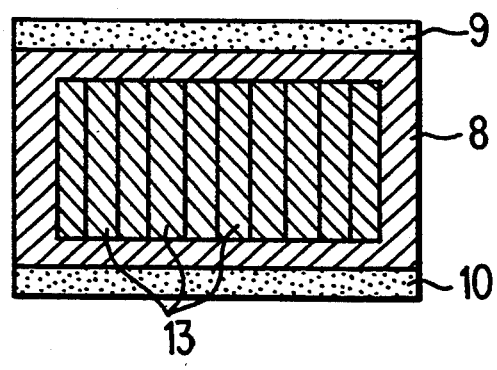
FIG. 6 is a sectional view through the component shown in FIG. 5, taken along lines V—V and VI—VI in the region of the inserts.

At each end, the longitudinal member 6 includes an insert 11, 12 as shown in FIG. 5, and as shown diagrammatically in FIG. 6 each insert 11, 12 is formed of bidirectional juxtaposed radial plies 13, having layers of fibres oriented at ±45 degrees and made of a carbon/epoxy type material. The inserts 11 and 12 are integrated into the longitudinal member 6 by the layerings 8 and the layers 9 and 10 which cover them, as in the case of the core 7.

Figure 7:
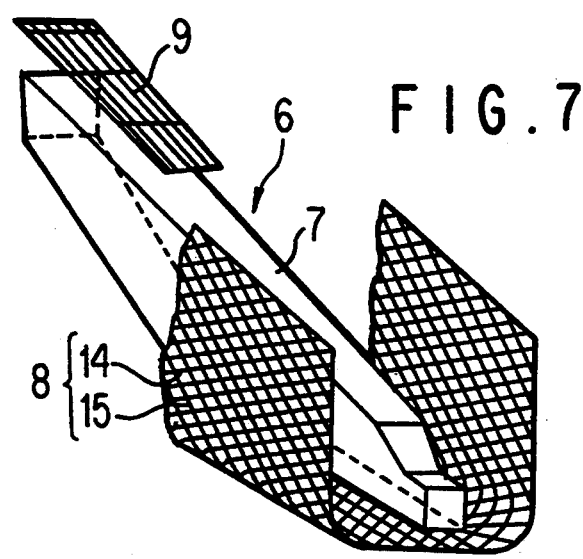
FIG. 7 is a diagrammatic perspective view illustrating a stage in the production of the platform shown in FIGS. 4 and 6.

FIG. 7 shows diagrammatically the manner of putting in place on the core 7 the said layers 8 of the sheets of crossed fibres 14 and 15, and an upper layer 9 of unidirectional plies, in forming the longitudinal member 6.

Figure 8:
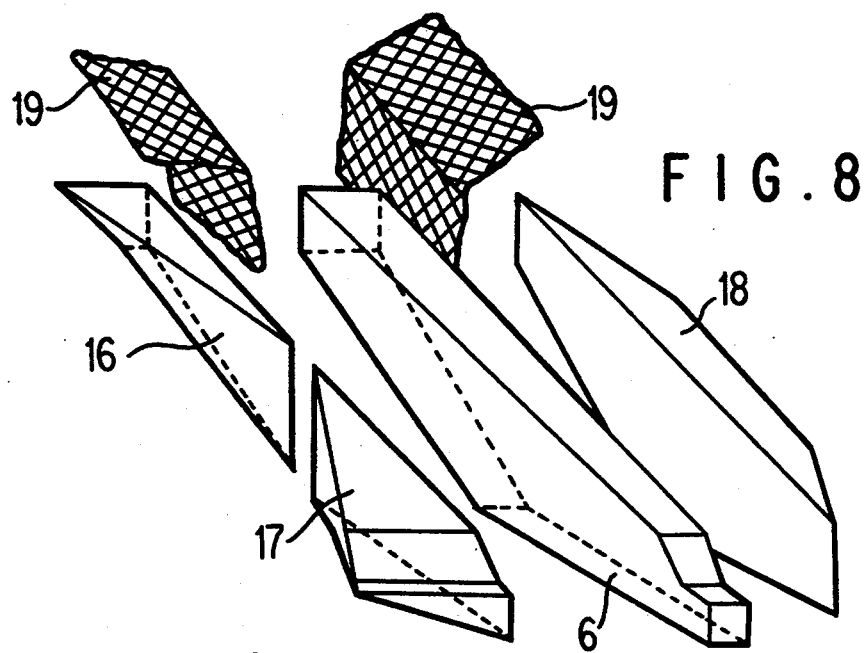
FIG. 8 is a view similar to FIG. 7 showing a further stage in the production of the platform.
Figure 9:
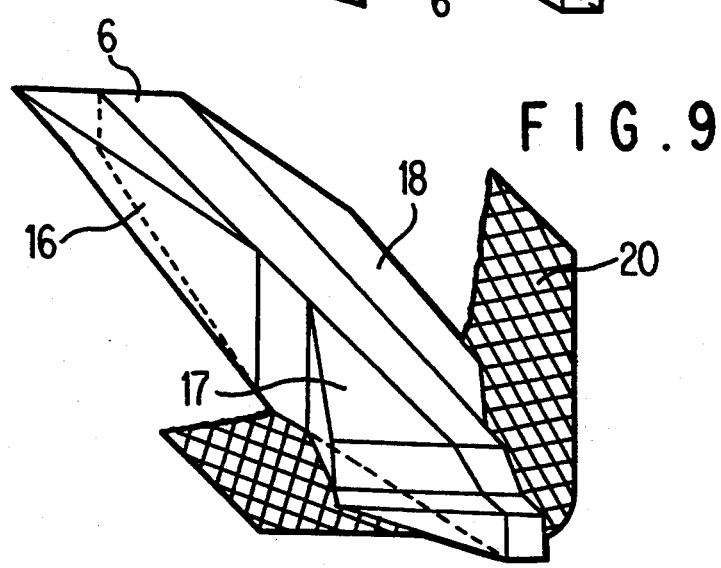
FIG. 9 is a view similar to FIGS. 7 and 8, showing a still further stage in the production of the platform.

As FIGS. 4 and 8 show, the platform 1 also comprises an assembly of foam cores 16, 17 and 18 juxtaposed on the longitudinal member 6. Plies 19 of a glass/epoxy type material are used to form a connection between the side faces of the longitudinal member 6 and the lateral packing cores 16, 17, 18. The laying of peripheral plies 20 of a glass/epoxy type material completes the overall connection of the structure of the platform 1, and the setting in place of the plies 20 is diagrammatically shown in FIG. 9.

The use of composite materials in the construction of the platform 1 as just described with reference to FIGS. 4 to 9, achieves a substantial mass gain relative to a construction using metallic materials, not only with regard to the platform 1 itself but also with regard to the weight reductions which it makes possible in other components, particularly the upstream and downstream plates 4 and 5 by which it is secured. The platform 1, in addition to forming part of the aerodynamic profile of the fluid flow path, has the capacity to withstand the applied stresses, particularly of centrifugal origin, because the provision of the structural longitudinal member 6 between its supports takes up all of the stresses.

The asymmetry of the platform 1, imposed by the shape of the blades 2 of the rotor, generates stresses, particularly torsional stresses, and the rectilinear profile of the longitudinal member 6 enables these stresses to be limited and absorbed. The bending stresses of the assembly are supported by the layers 9 and 10 of unidirectional plies, while the shearing stress and the overall torsional stress are supported by the bidirectional plies 8 of the longitudinal member 6. The reinforcement of the ends of the longitudinal member 6 by the inserts 11 and 12 enable the shearing stress at the supports of the platform to be absorbed.

Furthermore, it should be noted that, in the event of ingestion of foreign bodies by the engine which could, in extreme cases, lead to the loss of a conventional platform 1, a platform 1 in accordance with the invention also has the advantage of minimizing any damage, particularly in the region of the fan casing, by facilitating its retention.

We claim:

1. A separate inter-blade platform for a bladed disc of a turbomachine rotor, comprising a rectilinear structural longitudinal member defining a major axis and having opposite ends, upper and lower outer faces, and lateral outer faces, said longitudinal member being constituted by a foam core, an insert at each of said ends of said longitudinal member, each said insert being formed by juxtaposed radial plies of a carbon/epoxy type material in bidirectional sheets of fibres crossed at ±45 degrees, plies of a carbon/epoxy type material in bidirectional sheets of crossed fibres oriented at 45 degrees relative to said major axis laid around said foam core and said inserts, and plies of a carbon/epoxy type material in unidirectional sheets oriented in the direction of said major axis covering said plies laid around said foam core and said inserts on said upper and lower outer faces of said longitudinal member, lateral packing cores made of foam, plies of a glass/epoxy type material covering said lateral outer faces of said longitudinal member and connecting said longitudinal member to said lateral packing cores, and peripheral plies of a glass/epoxy type material covering the assembly formed by said longitudinal member and said lateral packing cores connected thereto.

* * * * *